United States Patent
Galbraith et al.

(10) Patent No.: US 8,654,464 B2
(45) Date of Patent: Feb. 18, 2014

(54) IMPLEMENTING MAGNETIC DEFECT CLASSIFICATION USING PHASE MODULATION

(75) Inventors: Richard Leo Galbraith, Rochester, MN (US); Weldon Mark Hanson, Rochester, MN (US); Martin Aureliano Hassner, Mountain View, CA (US); Travis Roger Oenning, Rochester, MN (US); Satoshi Yamamoto, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 91 days.

(21) Appl. No.: 13/277,047

(22) Filed: Oct. 19, 2011

(65) Prior Publication Data

US 2013/0100550 A1 Apr. 25, 2013

(51) Int. Cl.
*G11B 5/02* (2006.01)
(52) U.S. Cl.
USPC .......... 360/25; 360/31; 360/53; 360/59
(58) Field of Classification Search
None
See application file for complete search history.

(56) References Cited

U.S. PATENT DOCUMENTS

| | | | | |
|---|---|---|---|---|
| 4,881,136 A * | 11/1989 | Shiraishi et al. | | 360/25 |
| 5,212,677 A * | 5/1993 | Shimote et al. | | 369/53.17 |
| 5,424,638 A * | 6/1995 | Huber | | 324/212 |
| 6,088,176 A * | 7/2000 | Smith et al. | | 360/46 |
| 6,226,139 B1 * | 5/2001 | Yada | | 360/51 |
| 6,310,739 B1 * | 10/2001 | McEwen et al. | | 360/25 |
| 6,657,809 B2 * | 12/2003 | Ottesen et al. | | 360/77.03 |
| 7,457,212 B2 * | 11/2008 | Oh | | 369/47.14 |
| 7,929,235 B2 * | 4/2011 | Meier et al. | | 360/31 |
| 8,031,420 B2 * | 10/2011 | Mathew et al. | | 360/31 |
| 8,045,283 B2 * | 10/2011 | Yang et al. | | 360/31 |
| 8,077,571 B1 * | 12/2011 | Xia et al. | | 369/53.17 |
| 2002/0027854 A1 * | 3/2002 | Nakane et al. | | 369/53.17 |
| 2009/0097371 A1 * | 4/2009 | Honma et al. | | 369/53.16 |
| 2012/0265796 A1 * | 10/2012 | Vontela et al. | | 708/440 |

* cited by examiner

*Primary Examiner* — Dismery Mercedes
(74) *Attorney, Agent, or Firm* — Joan Pennington

(57) ABSTRACT

A method, apparatus, and system are provided for implementing magnetic defect classification using phase modulation for hard disk drives. A magnetic media readback signal of a hard disk drive is processed to identify predefined phase modulation (PM) characteristics to implement magnetic defect classification of magnetic media bump and pit defects.

15 Claims, 23 Drawing Sheets

114

- ΔV Complex Vector
  - Simple assignment of ADC samples to form complex delta vector
  - $(n\%4) == 0$ $\Delta V_n = +x_{n+1} + jx_n$ ($x_n$ is zero, $x_{n+1}$ is +peak)
  - $(n\%4) == 1$ $\Delta V_n = +x_n - jx_{n+1}$ ($x_n$ is +peak, $x_{n+1}$ is zero)
  - $(n\%4) == 2$ $\Delta V_n = -x_{n+1} - jx_n$ ($x_n$ is zero, $x_{n+1}$ is -peak)
  - $(n\%4) == 3$ $\Delta V_n = -x_n + jx_{n+1}$ ($x_n$ is -peak, $x_{n+1}$ is zero)

116

MASTER ROTATOR AND
SLAVE ROTATOR 511

- for i = 0 to 5
- if (m_imag$_i$ < 0) then d$_i$ = +1 else d$_i$ = -1
- m_real$_{i+1}$ = m_real$_i$ − m_imag$_i$*d$_i$*$2^{-i}$
- m_imag$_{i+1}$ = m_imag$_i$ + m_real$_i$*d$_i$*$2^{-i}$
- s_real$_{i+1}$ = s_real$_i$ − s_imag$_i$*d$_i$*$2^{-i}$
- s_imag$_{i+1}$ = s_imag$_i$ + s_real$_i$*d$_i$*$2^{-i}$
- end

IMPLEMENTING MAGNETIC DEFECT CLASSIFICATION USING PHASE MODULATION

FIELD OF THE INVENTION

The present invention relates generally to the data storage field, and more particularly, relates to a method, apparatus, and system for implementing magnetic defect classification using phase modulation for hard disk drives.

DESCRIPTION OF THE RELATED ART

In hard disk drives (HDDs) magnetoresistive (MR) sensors typically are used to sense magnetic patterns of data recorded on a writable disk surface. MR sensors detect the magnetic field strength changes (DH) experienced by the magnetic sensor while passing over magnetically written bits on the spinning magnetic disk media, and directly convert the detected DH to an electrical signal with a time-varying voltage level (DV), which can be converted into data bits by the read channel electronics.

Two types of magnetic disk media defects include bumps or thermal-asperity (TA) defects and pits or hole defects. Classifying bumps or thermal-asperity (TA) defects and pits or hole defects is needed for effective use of the magnetic disk media.

Bumps or thermal-asperity (TA) defects have a height above the media's top surface plane and a slider carrying the MR sensor can strike or impact these defects. Bumps must be given a wider berth by the slider as any impact between slider and bumps can loosen overcoat material causing debris inside the HDD enclosure and possibly causing thermal asperity events in the read-back signal. This often results in more unusable physical data block addresses that otherwise have good magnetic properties.

Pits or hole defects sink below the plane of the media. The pits are not reliable for storing data, for example because the magnetic media is compromised and are further from the read-write elements. The pits however can be passed over by the slider without a TA event and the surrounding magnetic media can be used to store data. For example, the slider does not need to give the pits a wide berth requiring less sparing and better yield for enterprise media especially which has strict defect tolerances.

U.S. Pat. No. 7,929,235 issued Apr. 19, 2011 to Meier et al., discloses a method and system for distinguishing spatial or pit defects and bumps or thermal defects on perpendicular media. The magnetic domains of the perpendicular media are oriented to have a first polarity, scanned using a read head, oriented to have a second polarity and scanned again. The signals from the read head are combined to produce output signals having improved signal to noise ratios from which the locations of spatial and thermal defects can be identified and distinguished. FIGS. 2A and 2B respectively show a pit defect and an amplitude modulation (AM) readback signal when reading over the pit. FIGS. 8A-8D compare AM readback signals of pit and bump defects.

U.S. Pat. No. 6,088,176 issued Jul. 11, 2000 to Smith et al., discloses an apparatus and method for separating magnetic and thermal components from an MR signal with reading an information signal from a magnetic storage medium using a magnetoresistive (MR) head, and separating a thermal signal component and, if present, a magnetic signal component from the information signal. Head-to-disk spacing change using a thermal signal to detect disk surface defects, topographic variations, and servo control surface variations. FIG. 7 illustrates a pit and bump example with a thermal response voltage level. FIGS. 19A-C show waveforms with less readback signal amplitude caused by a disk surface pit. FIG. 20 provides a bump example with magnetic and thermal response voltage level response from a TA event. A classification circuit/filter using thermal response signal differences or amplitude modulation (AM) is shown if FIG. 23.

A need exists for effective mechanism to implement magnetic defect classification. It is desirable to provide such mechanism to allow for efficient and effective magnetic media usage that provides enhanced data storing performance substantially without negative effect.

SUMMARY OF THE INVENTION

Aspects of the present invention are to provide a method, apparatus, and system for implementing magnetic defect classification using phase modulation for hard disk drives. Other important aspects of the present invention are to provide such method, apparatus, and system substantially without negative effect and to overcome some of the disadvantages of prior art arrangements.

In brief, a method, apparatus, and system are provided for implementing magnetic defect classification using phase modulation for hard disk drives. A magnetic media readback signal of a hard disk drive is processed to identify predefined phase modulation (PM) characteristics to implement magnetic defect classification of magnetic media bump and pit defects.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the embodiments of the invention, a method, apparatus, and system for implementing magnetic defect classification using phase modulation for hard disk drives (HDDs) are provided. The system implements magnetic defect classification using phase modulation, providing enhanced capacity yield for the data storage media.

Figure 1:
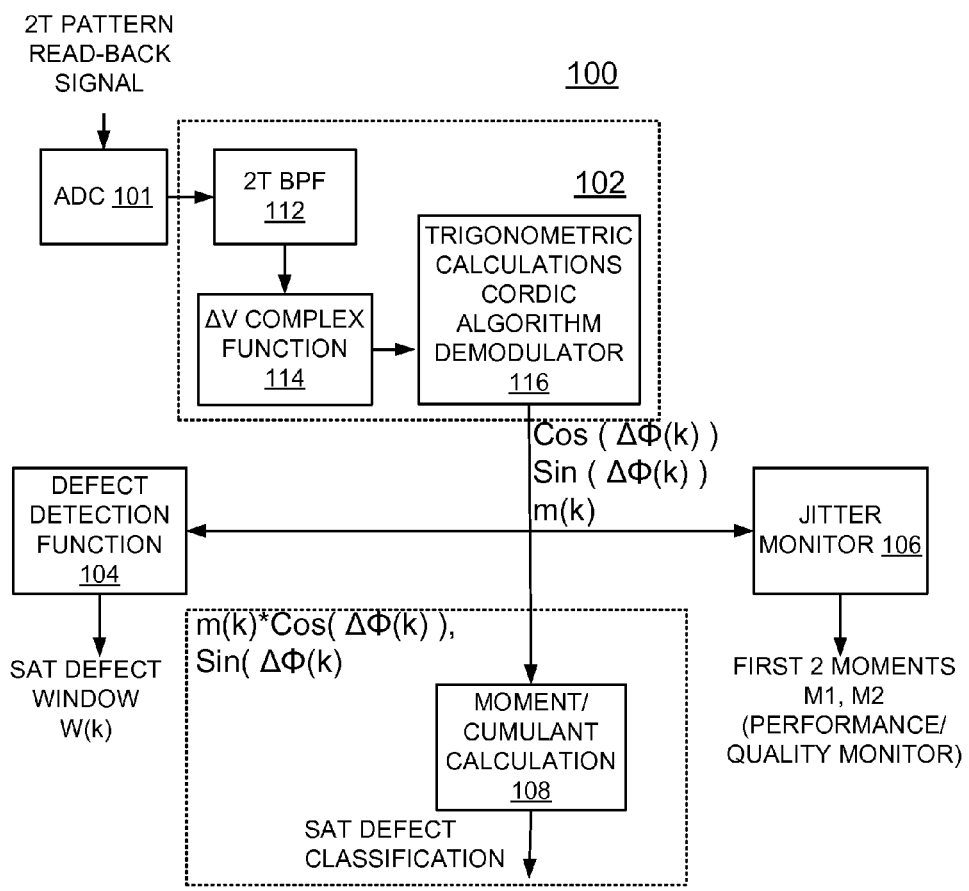
FIG. 1 is a block diagram representation illustrating a system for implementing magnetic defect classification using phase modulation for hard disk drives (HDDs) in accordance with an embodiment of the invention.

Having reference now to the drawings, in FIG. 1, there is shown a system for implementing magnetic defect classification methods using phase modulation for hard disk drives (HDDs) generally designated by the reference character 100 in accordance with an embodiment of the invention. System 100 detects and distinguishes media defects including bumps or thermal-asperity (TA) defects and pit or hole defects using phase modulation (PM) classification. Signal amplitude modulation (AM) optionally is used in conjunction with PM defect classification.

As shown in FIG. 1, system 100 includes an analog-to-digital converter (ADC) 101, a 2T pattern front-end signal processing circuit 102 receiving the ADC readback and generating Phase Modulation (PM) and Amplitude Modulation (AM) signals represented by $Cos(\Delta\Phi(k))$, $Sin(\Delta\Phi(k))$, and $m(k)$ coupled to each of a defect detection function 104 identifying a surface analysis test (SAT) defect window $W(k)$, a jitter monitor 106 identifying first 2 moments m1, m2 providing a performance and quality monitor, and a moment and cumulant calculation block 108 providing SAT defect classification distinguishes defects and pit or hole defects or delamination (DLM) defects media bumps or thermal-asperity (TA) defects or hybrid TADLM defects.

In accordance with features of the embodiments of the invention, the pit or DLM defect references the signature of a drop-out in the read envelope caused by removal or lack of magnetic media below the read sensor. The pit or DLM defect indicates that the magnetic media may have been removed from the disk, while the DLM defects detected in the characterization work are typically substrate pits or voids below the magnetic layers, and have a characteristic in which there is significant depth or magnetic separation between the head and disk magnetic layer at the center of the void. As a result of the void or DLM defect having depth which causes the effective write spacing to increase, the write gradient at the heads' trailing edge moves in the downtrack direction relative to the write head and results in a phase shift being written to the media at the entry and exit of the void. The phase shift in the read back signal is used to determine the condition of the increased write separation. The TA signature for a TMR head also creates a drop-out in the envelope of the read signal, but in this case, as this is caused by reduction in the output of the sensor, there exists no phase change. The TA event is caused by protrusion of some material out of the surface of the disk, due to hard particles embedded to the surface of the disk, debris accumulation at a void or delamination on the disk surface, or by presputter contamination. The classifications for the pit or hole or DLM defect and the TA or TADLM defects indicating a write separation increase.

In accordance with features of the embodiments of the invention, the 2T pattern front-end signal processing circuit 102 generates a high quality Amplitude Modulation (AM) signal with PM insensitivity, generates a high quality Phase Modulation (PM) signal with AM insensitivity, where an identified $Cos(\Delta\Phi)$ provides a tolerant indicator of phase movement, and an identified $Sin(\Delta\Phi)$ provides a sensitive indicator of phase movement. The 2T pattern front-end signal processing circuit 102 reduces measurement variability of the generated AM and PM signals due to noise sources, such as, transition position jitter, other media noise, and electronic noise.

In accordance with features of the embodiments of the invention, the 2T pattern front-end signal processing circuit 102 is used by the defect detection function 104, for example, using both generated AM and PM signal information, and the moment and cumulant calculation block 108 for defect classification, for example, using both generated AM and PM signal information, and a signal analysis tool with the jitter monitor 106 using generated PM signal information.

In accordance with features of the embodiments of the invention, the 2T pattern front-end signal processing circuit 102 transforms signal processing elements into practical circuits such as for simple implementation into a system on a chip (SOC).

Figure 2:
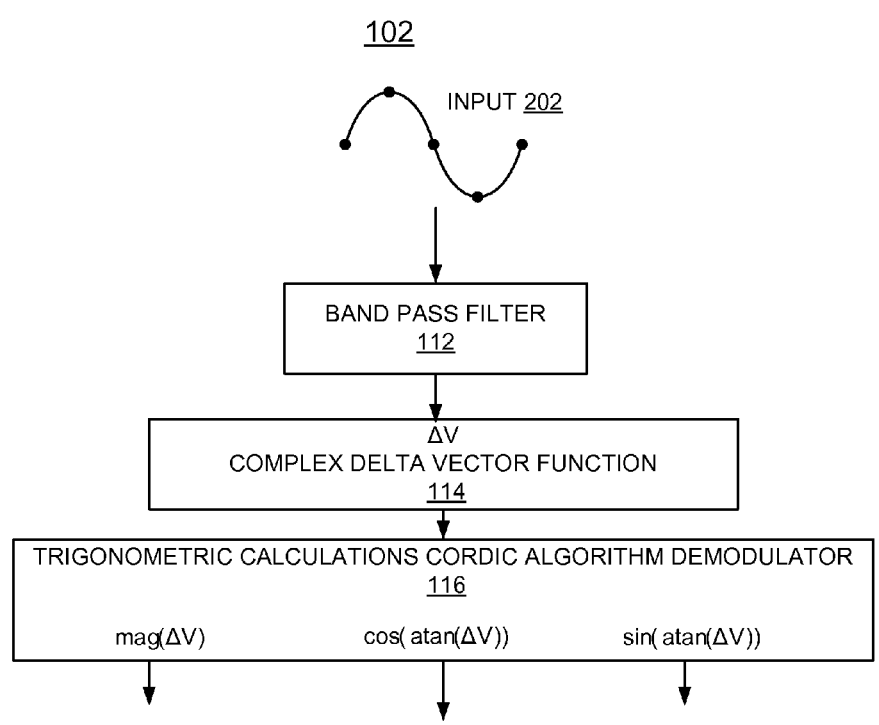
FIG. 2 is a block diagram representation illustrating an example 2T pattern front-end signal processing circuit of the system of FIG. 1 for magnetic defect classification using phase modulation for hard disk drives (HDDs) in accordance with an embodiment of the invention.

Referring to FIG. 1 and FIG. 2, a 2T pattern readback signal, where 1/T is the sample rate, is captured by a read head and applied to the analog-to-digital converter (ADC) 101. A 2T pattern readback signal ADC samples output generally designated by the reference character 202 in FIG. 2, where the 2T pattern sampled signal from the ADC 101 is assumed channel sampling at peaks and zeros. The 2T pattern sampled signal from the ADC 101 is applied to a 2T bandpass filter 112 of the 2T pattern front-end signal processing circuit 102 of the invention. The 2T bandpass filter 112 provides bandpass filtering centered at the 2T frequency, which is disabled for jitter σ measurement, and the bandpass filtered sampled signal is applied to a ΔV complex vector function 114 formed by adjacent ADC sample pairs coupled to a trigonometric calculations CORDIC algorithm demodulator 116. The trigonometric calculations CORDIC algorithm demodulator 116 uses a CORDIC algorithm to perform trigonometric calculations for generating AM and PM signals. As shown, the trigonometric calculations CORDIC algorithm demodulator 116 produces Phase Modulation (PM) readback signals Cos(ΔΦ (k)), Sin(ΔΦ(k)), and Amplitude Modulation (AM) readback signal m(k).

Figure 3A:
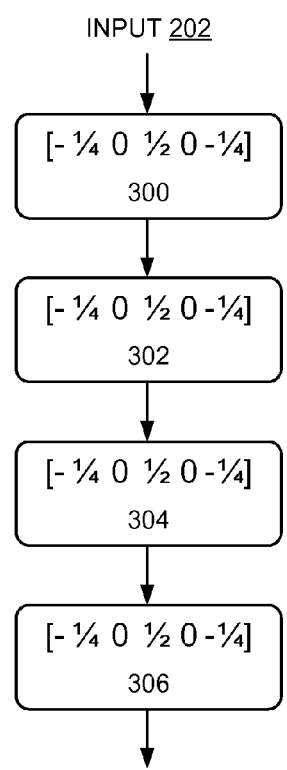
FIG. 3A is a block diagram representation of an example 2T band pass filter of the 2T pattern front-end signal processing circuit of the system of FIG. 1 for magnetic defect classification using phase modulation for hard disk drives (HDDs) in accordance with an embodiment of the invention.
Figure 3B:
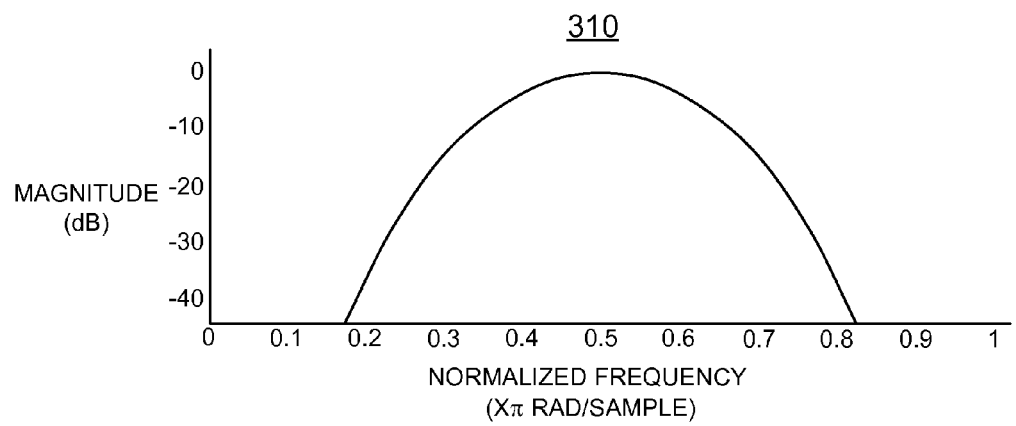
FIGS. 3B and 3C are waveforms illustrating example operations of the 2T band pass filter of FIG. 3A in accordance with embodiments of the invention.
Figure 3C:
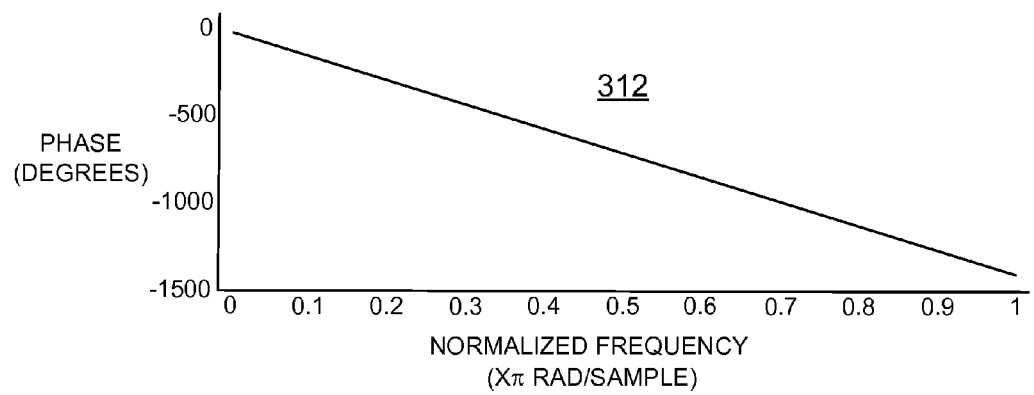

Referring also to FIGS. 3A, 3B and 3C, there is shown an example 2T bandpass filter 112 of the 2T pattern front-end signal processing circuit 102 of the system 100 for magnetic defect classification using phase modulation for hard disk drives (HDDs) in accordance with an embodiment of the invention together with waveforms illustrating example operations of the 2T bandpass filter 112.

In FIG. 3A, the example 2T band pass filter 112 in accordance with the invention is represented by [−0.25 0 0.5 0 −0.25] with unity gain at the 2T frequency, and linear phase. The 2T bandpass filter 112 can be viewed as a shift and add computation, with a plurality or four stages 300, 302, 304, 306 providing respective responses generally designated by the reference characters 310, 312 in FIGS. 3B and 3C.

Figures 4A, 4B:
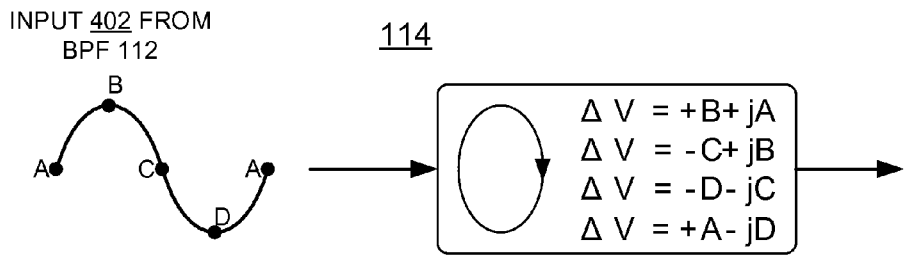
FIGS. 4A and 4B are schematic and block diagram representations of an example complex delta vector function of the 2T pattern front-end signal processing circuit of the system of FIG. 1 for magnetic defect classification using phase modulation for hard disk drives (HDDs) in accordance with an embodiment of the invention.

FIGS. 4A and 4B illustrate an example complex delta vector function 114 of the 2T pattern front-end signal processing circuit 102 of the system 100 for magnetic defect classification using phase modulation for hard disk drives (HDDs) in accordance with an embodiment of the invention. The ΔV Complex Vector 114 is implemented by a simple assignment of ADC samples input 402 from the 2T bandpass filter 112 to form complex delta vector, where the ΔV vector 114 is a positive real vector at expected sampling phase, as illustrated in FIG. 4A including, ΔV=+B+jA, ΔV=−C+jB, ΔV=−D−jC, ΔV=+A−Jd and generally defined as follows:

(n %4)==0→ΔVn=+xn+1+jxn (xn is zero, xn+1 is +peak)

(n %4)==1→ΔVn=+xn−jxn+1 (xn is +peak, xn+1 is zero)

(n %4)==2→ΔVn=−xn+1−jxn (xn is zero, xn+1 is −peak)

(n %4)==3→ΔVn=−xn+jxn+1 (xn is −peak, xn+1 is zero)

Figure 5A:
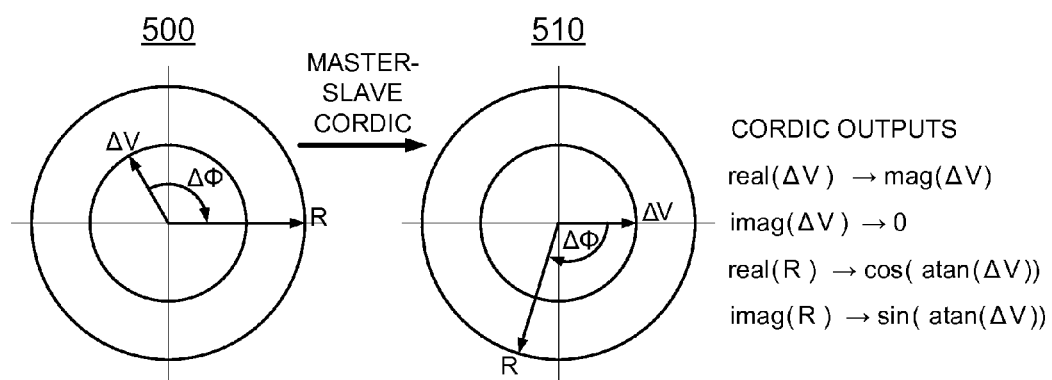
FIGS. 5A and 5B are schematic and block diagram representations of an example trigonometric calculations function using CORDIC of the 2T pattern front-end signal processing circuit of the system of FIG. 1 for magnetic defect classification using phase modulation for hard disk drives (HDDs) in accordance with an embodiment of the invention.
Figure 5B:
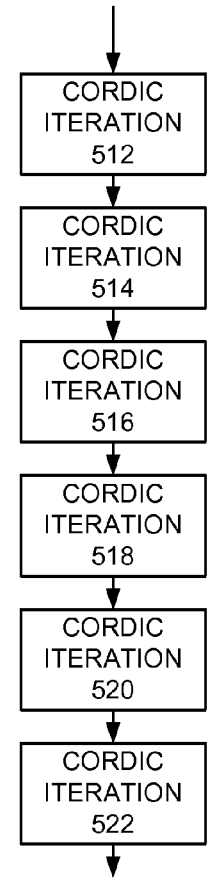

Referring to FIGS. 5A and 5B, an example trigonometric calculations function 116 using a COordinate Rotation DIgital Computer (CORDIC) algorithm is shown for the 2T pattern front-end signal processing circuit 102 of the system 100 for magnetic defect classification using phase modulation for hard disk drives (HDDs) in accordance with an embodiment of the invention. The CORDIC algorithm is an iterative shift and add algorithm, pipelined for implementation speed. The CORDIC algorithm preferably used for the trigonometric calculations is currently used in HDD channels for Servo PES calculation.

In FIG. 5A, a first input ΔV vector generally designated by the reference character 500 is shown. A second ΔV vector generally designated by the reference character 510 is shown following a master—slave CORDIC rotation of the ΔV vector by ΔΦ to make it a positive real only vector, and with the slave CORDIC goal to rotate the R (reference) vector by the same ΔΦ as a slave to the master. The CORDIC outputs include:

real(ΔV)→mag(ΔV)

imag(ΔV)→0 real(R)→cos(a tan(ΔV))

imag(R)→sin(a tan(ΔV))

In FIG. 5B, trigonometric calculations function 116 includes a rotation matrix computation with a common direction (di) control signal for each of a pair of rotators used respectively for a master rotator and a slave rotator 511 is represented, for example, as follows:

for $i$=0 to 5 if ($m$_imagi<0) then $di$=+1 else $di$=−1

$m$_reali+1=$m$_reali−$m$_imagi*$di$*2−$i$ $m$_imagi+1=$m$_imagi+$m$_reali*$di$*2−$i$ $s$_reali+1=$s$_reali−$s$_imagi*$di$*2−$i$ $s$_imagi+1=$s$_imagi+$s$_reali*$di$*2−$i$ end The trigonometric calculations function 116 is an iterative algorithm which advantageously is pipelined for implementation speed and is a shift and add algorithm, which makes it implementation friendly. As further illustrated in FIG. 5B, the trigonometric calculations function 116 includes a plurality of pipelined CORDIC iterations 512, 514, 516, 518, 520, 522, where approximately 5-7 iterations leads to an accurate answer.

Figure 6:
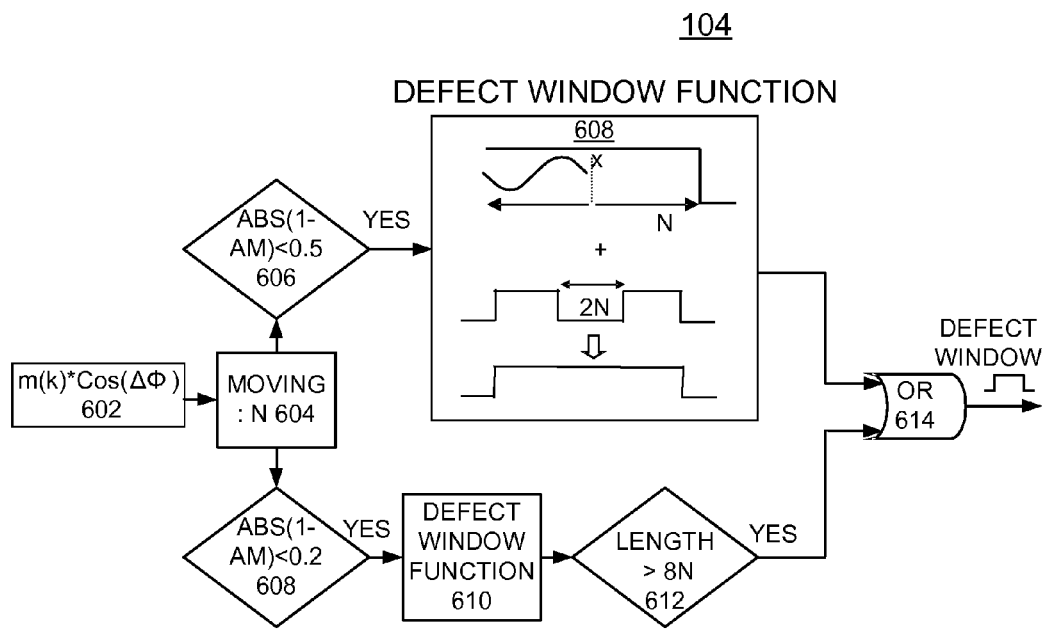
FIG. 6 is a block diagram representation of an example defect detection function of the 2T pattern front-end signal processing circuit of the system of FIG. 1 for magnetic defect classification using phase modulation for hard disk drives (HDDs) in accordance with an embodiment of the invention.

Referring to FIG. 6, an example defect detection function 104 is shown that is used with the 2T pattern front-end signal processing circuit 102 of the system 100 for magnetic defect classification using phase modulation for hard disk drives (HDDs) in accordance with an embodiment of the invention. As shown, the defect detection function 104 includes a first processing block m(k)*Cos(ΔΦ) 602 receiving signals N samples/Cycle or for the 2T Pattern receiving 4 samples/Cycle. The first processing block m(k)*Cos(ΔΦ) 602 applies an input to a moving average N processing block 604 coupled to a first decision block 606 comparing an absolute value of 1 minus the moving average AM signal being less than 0.5, ABS(1−AM)<0.5, which identifies, for example, a sharp and deep and narrow readback signal waveform, and a second decision block 608 comparing an absolute value of 1 minus the moving average AM signal being less than 0.2, or ABS (1−AM)<0.2 which identifies a shallow and long readback signal waveform. When the first decision block 606 identifies a sharp and deep and narrow defect readback signal waveform, a first defect window function 608 provides a first window output defect signal. When the second decision block 608 identifies a shallow and long readback signal waveform, a second defect window function 610 provides a second window output defect signal, which is applied to a decision block 612 comparing the second window output signal with a length of greater than 8N. The first window output signal of first defect window function 608 is applied to a first input of a two-input OR gate 614. When the length is greater than 8N, the output of decision block 612 is applied to a second input of OR gate 614, which provides an ORed output signal labeled DEFECT WINDOW for the identified defect.

In accordance with features of the embodiments of the invention, the windowing of the identified defect at the first defect window function 608 and the second defect window function 610 is used in the context of the phase measurement for determining if a spacing change existed in this region of the signal for usage in the classification of the defect as having depth and having phase change as a pit or DLM defect or alternately, if none exists, then caused by a protrusion or bump or TA or TADLM defect.

In accordance with features of the embodiments of the invention, the jitter monitor function 106 measures jitter or σ measured, which is very accurate when compared to actual jitter across density. The jitter monitor function 106 has been tested with varying head asymmetry, electronics noise, and transition density variation and observed the same accurate measurement of jitter noise.

Figure 7:
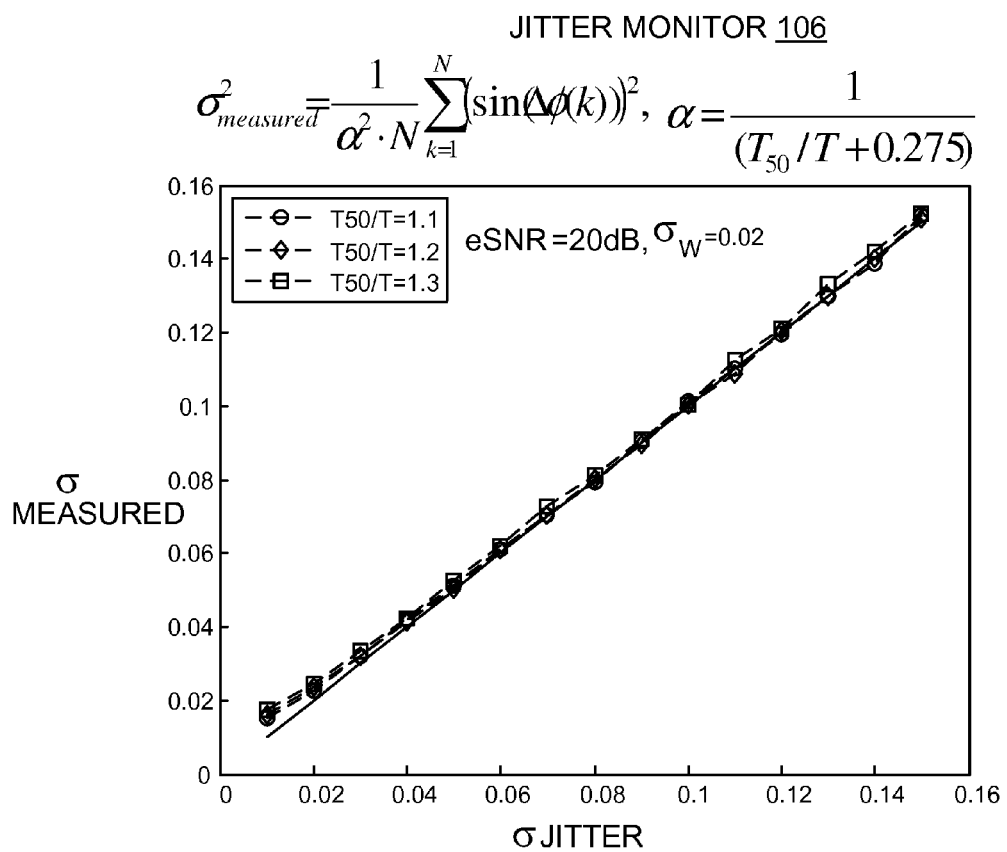
FIG. 7 are waveforms illustrating example operations of an example jitter monitor function of the 2T pattern front-end signal processing circuit of the system of FIG. 1 for magnetic defect classification using phase modulation for hard disk drives (HDDs) in accordance with an embodiment of the invention.

Referring to FIG. 7 there are shown example operations of the jitter monitor function 106 coupled to the 2T pattern front-end signal processing circuit 102 of the system 100 for magnetic defect classification using phase modulation for hard disk drives (HDDs) in accordance with an embodiment of the invention, where T50/T=1.1, T50/T=1.2, and T50/T=1.3.

As shown in FIG. 7, the jitter monitor function 106 is represented by:

$$\sigma^2_{measured} = \frac{1}{\alpha^2 \cdot N} \sum_{k=1}^{N} (\sin(\Delta\phi(k)))^2,$$

$$\alpha = \frac{1}{(T_{50}/T + 0.275)}$$

Figure 8:
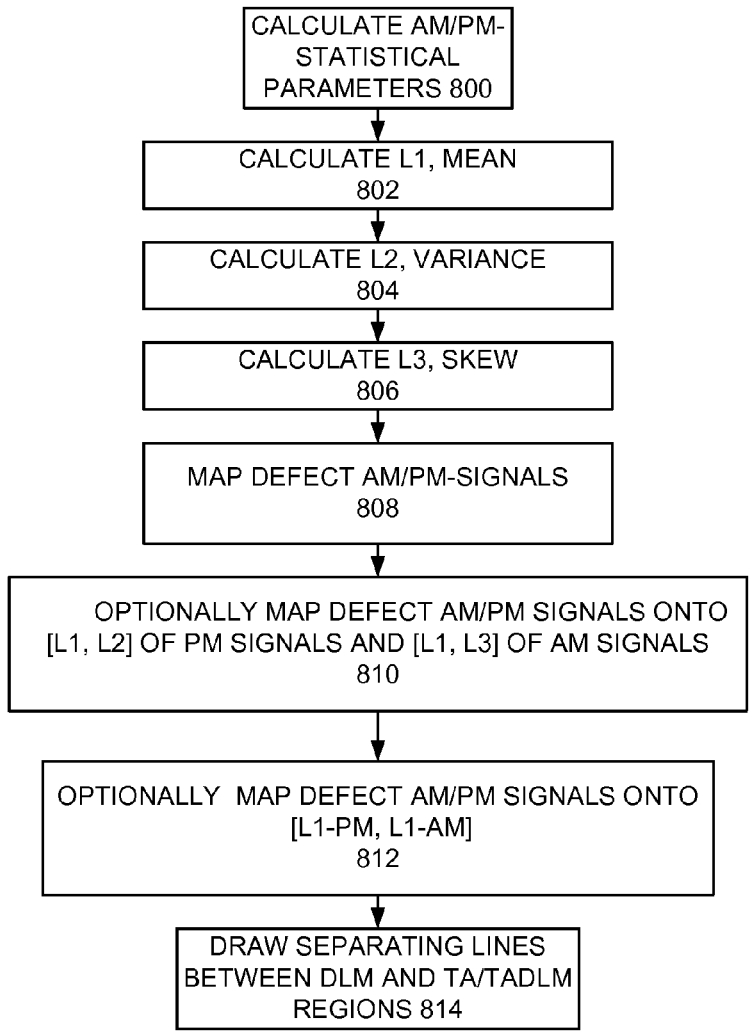
FIG. 8 is a flow chart illustrating example operations of the system of FIG. 1 for implementing magnetic defect classification methods using phase modulation for hard disk drives (HDDs) in accordance with an embodiment of the invention.

Referring to FIG. 8, there are shown example operations of the system 100 for implementing magnetic defect classification methods using phase modulation for hard disk drives (HDDs) in accordance with an embodiment of the invention. As indicated at a block 800, AM and PM statistical parameters are calculated, where L1, mean is calculated as indicated at a block 802, with L2, variance is calculated as indicated at a block 804, and with L3, skew is calculated as indicated at a block 806.

As indicated at a block 808, the defect AM and PM signals are mapped. The defect AM and PM signals optionally are mapped onto [L1, L2] of PM signals and onto [L1, L3] of AM signals as indicated at a block 810. For example, [L1, L3] defect classification using PM and AM signals is illustrated in FIG. 10.

Alternatively defect AM and PM signals optionally are mapped onto [L1] of PM signals and onto [L1] of AM signals as indicated at a block 812. Separating lines are drawn between pit or DLM regions and bump or TA or TADLM regions as indicated at a block 814.

Figure 9:
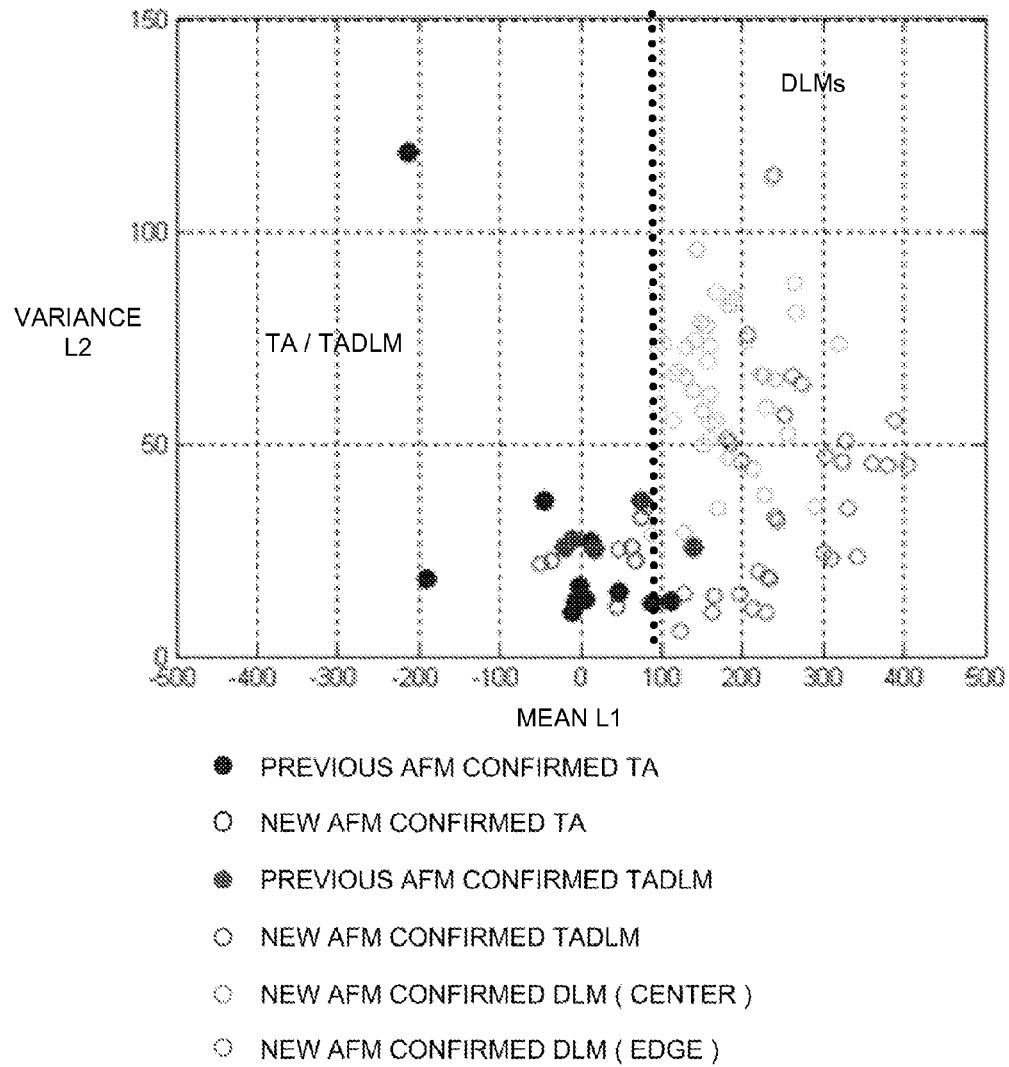
FIG. 9 illustrates example [L1, L2] defect classification results using phase modulation signals for hard disk drives (HDDs) in accordance with an embodiment of the invention.

Referring also to FIG. 9, example [L1, L2] defect classification results using phase modulation signals for hard drives (HDDs) are illustrated in accordance with an embodiment of the invention. The L2 variance is shown relative to the vertical axis and L1 mean shown relative to the horizontal axis indicated by TA/TADLM for bumps.

Figure 10:
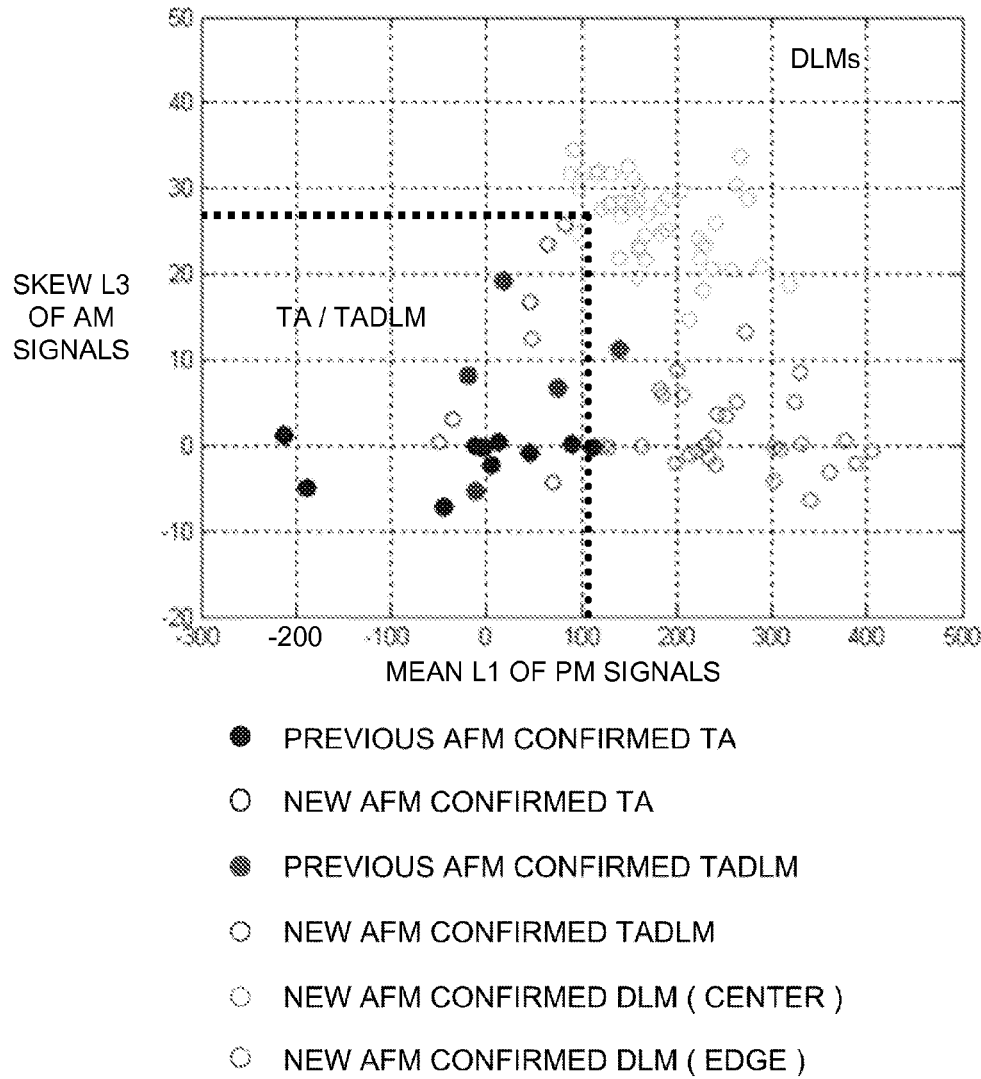
FIG. 10 illustrates example [L1, L3] defect classification results using phase modulation and amplitude modulation signals for hard disk drives (HDDs) in accordance with an embodiment of the invention.

Referring also to FIG. 10, example [L1, L3] defect classification results using phase modulation and amplitude modulation signals for hard disk drives (HDDs) are illustrated in accordance with an embodiment of the invention. The L3 skew of AM signals is shown relative to the vertical axis and L1 mean shown relative to the horizontal axis indicated by TA/TADLM for bumps, and DLMs for pits.

Figure 11:
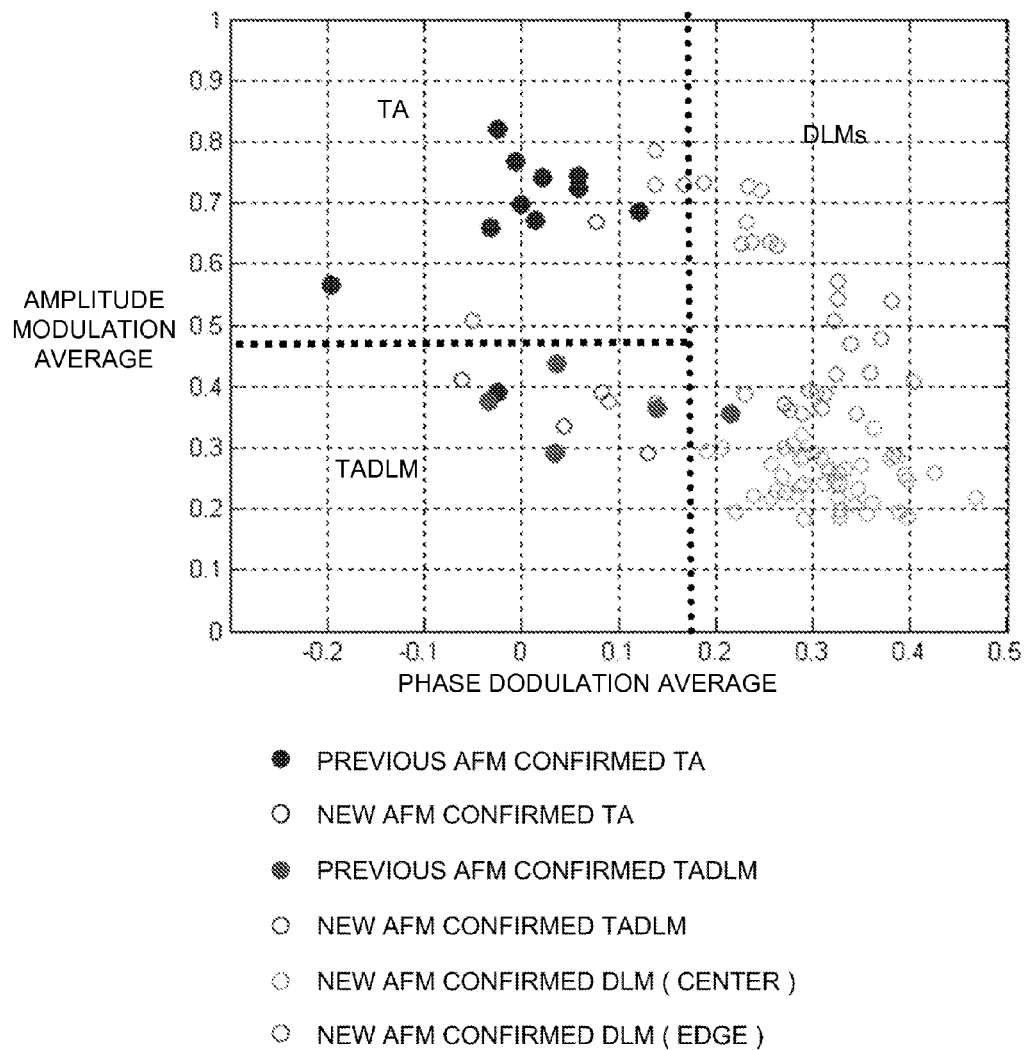
FIG. 11 illustrates example average phase modulation and amplitude modulation signals with phase and amplitude modulation plane for hard disk drives (HDDs) in accordance with an embodiment of the invention.

Referring also to FIG. 11, example average phase modulation and amplitude modulation signals with phase and amplitude modulation plane for hard disk drives (HDDs) are illustrated in accordance with an embodiment of the invention indicated by TA and TADLM for bumps, and DLMs for pits.

Referring also to FIGS. 12A-12E, pit or DLM defect classification are illustrated with an example 31 defect tracks, and defect size of 150 nm×31 or 4650 nm using phase modulation and amplitude modulation signals for hard disk drives (HDDs) in accordance with an embodiment of the invention.

Figure 12A:
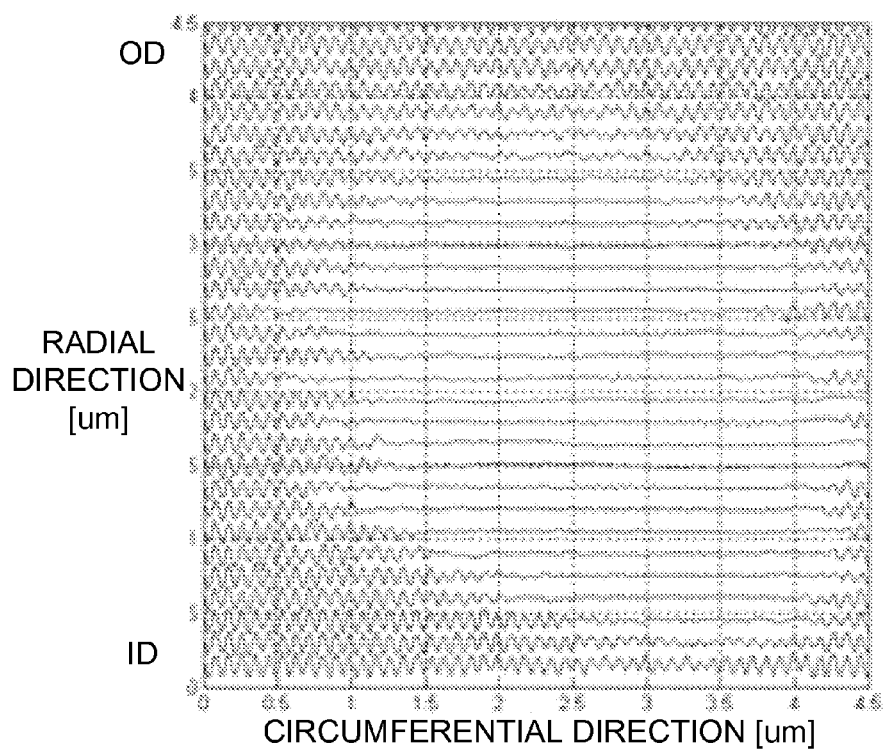
FIGS. 12A-12E illustrate pit or Delamination (DLM) defect classification with an example 31 defect tracks, and defect size of 150 nm×31 or 4650 nm using phase modulation and amplitude modulation signals for hard disk drives (HDDs) in accordance with an embodiment of the invention.
Figure 12B:
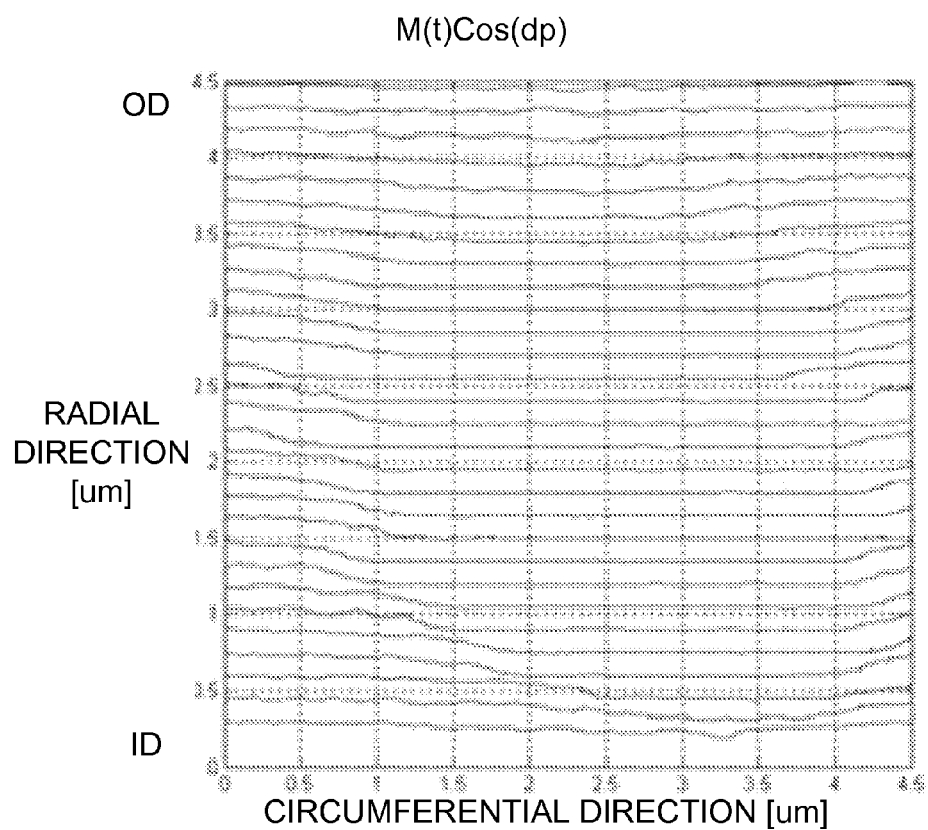
Figure 12C:
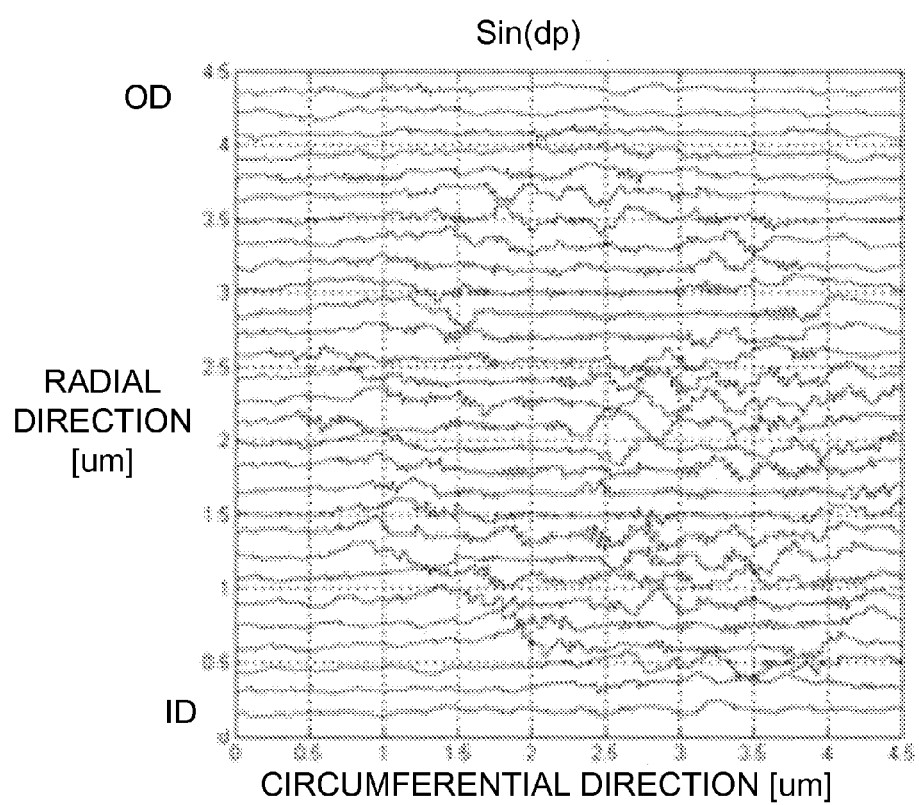
Figure 12D:
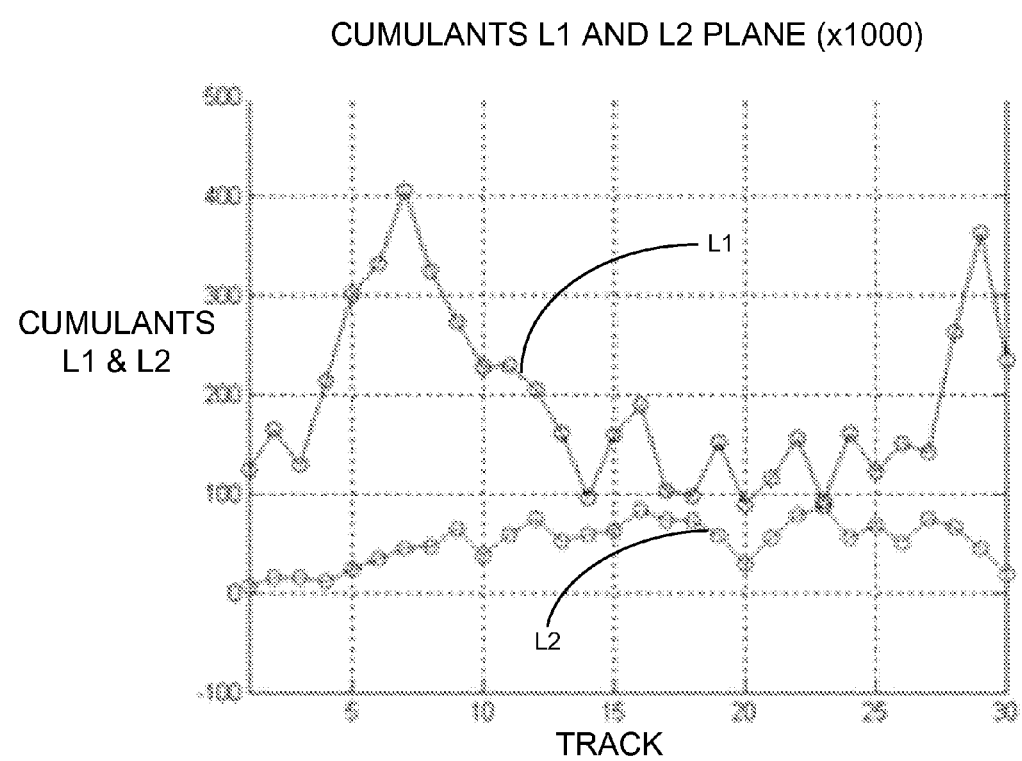
Figure 12E:
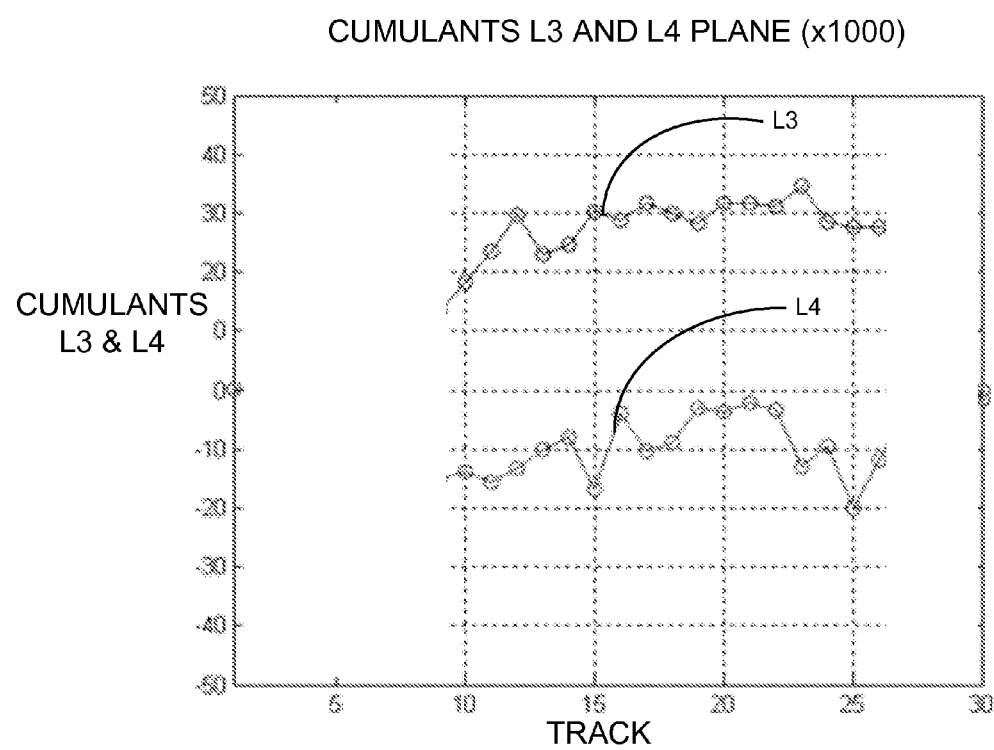

In FIG. 12A, an example readback waveform with a radial direction illustrated relative to the vertical axis and a circumferential direction illustrated relative to the horizontal axis for the example 31 pit or DLM defect tracks. FIG. 12B illustrates example amplitude modulation signals M(t)Cos(dp) with a radial direction illustrated relative to the vertical axis and a circumferential direction illustrated relative to the horizontal axis for the example 31 pit or DLM defect tracks. FIG. 12C illustrates example phase modulation signals Sin(dp) with a radial direction illustrated relative to the vertical axis and a circumferential direction illustrated relative to the horizontal axis for the example 31 pit or DLM defect tracks. FIG. 12D illustrates example L1, mean and L2, variance plane (×1000) of phase modulation (PM) signals with cumulants L1 and L2 illustrated relative to the vertical axis and tracks illustrated relative to the horizontal axis for the example 31 pit or DLM defect tracks. FIG. 12E illustrates example L3, skew and L4, variance plane (×1000) of phase modulation (PM) signals with cumulants L3 and L4 illustrated relative to the vertical axis and tracks illustrated relative to the horizontal axis for the example 31 pit or DLM defect tracks.

Referring also to FIGS. 13A-13E, thermal asperity (TA) or TADLM defect classification are illustrated with an example 5 defect tracks, and defect size of 150 nm×5 or 740 nm using phase modulation and amplitude modulation signals for hard disk drives (HDDs) in accordance with an embodiment of the invention.

Figure 13A:
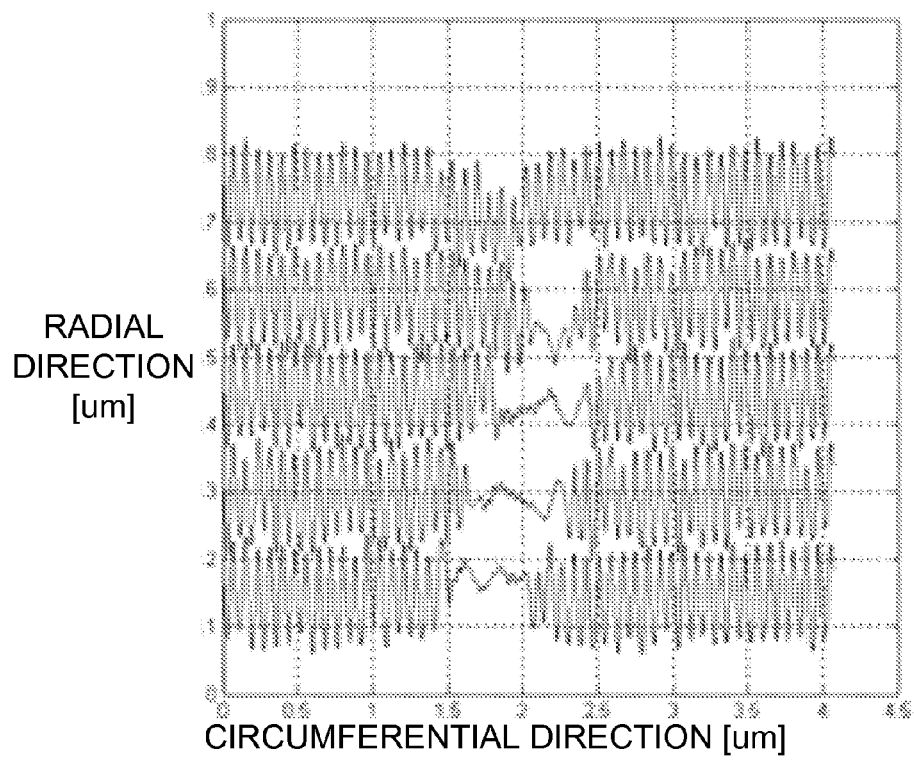
FIGS. 13A-13E illustrate thermal asperity (TA) or TADLM defect classification with an example 5 defect tracks, and defect size of 150 nm×5 or 740 nm using phase modulation and amplitude modulation signals for hard disk drives (HDDs) in accordance with an embodiment of the invention.
Figure 13B:
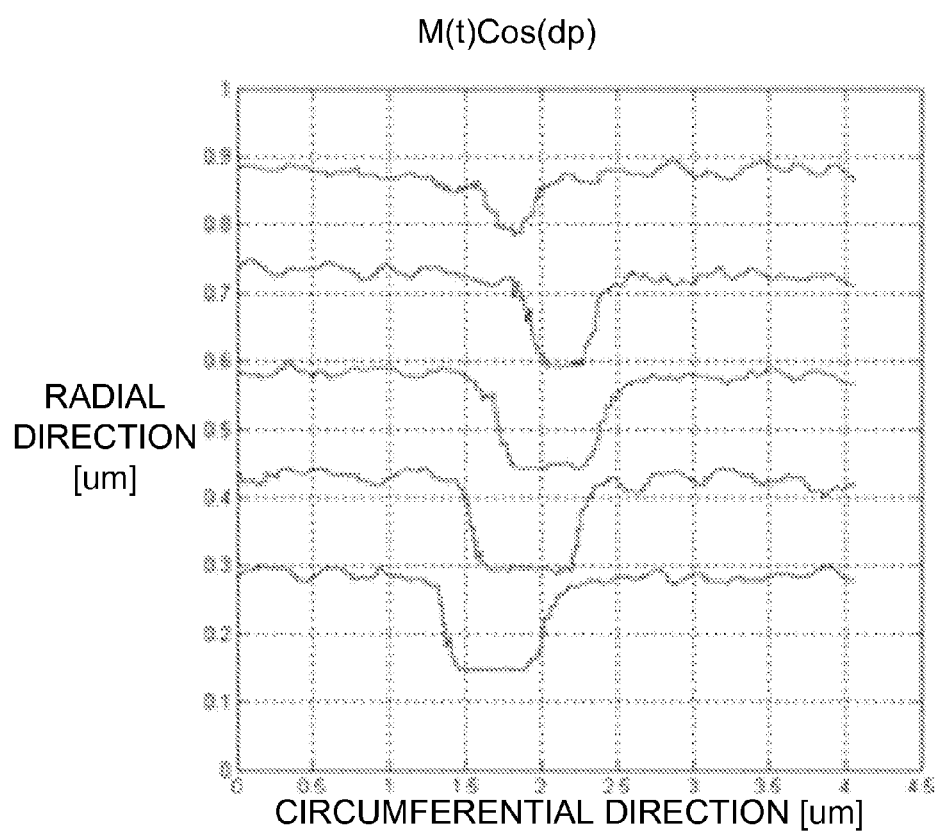
Figure 13C:
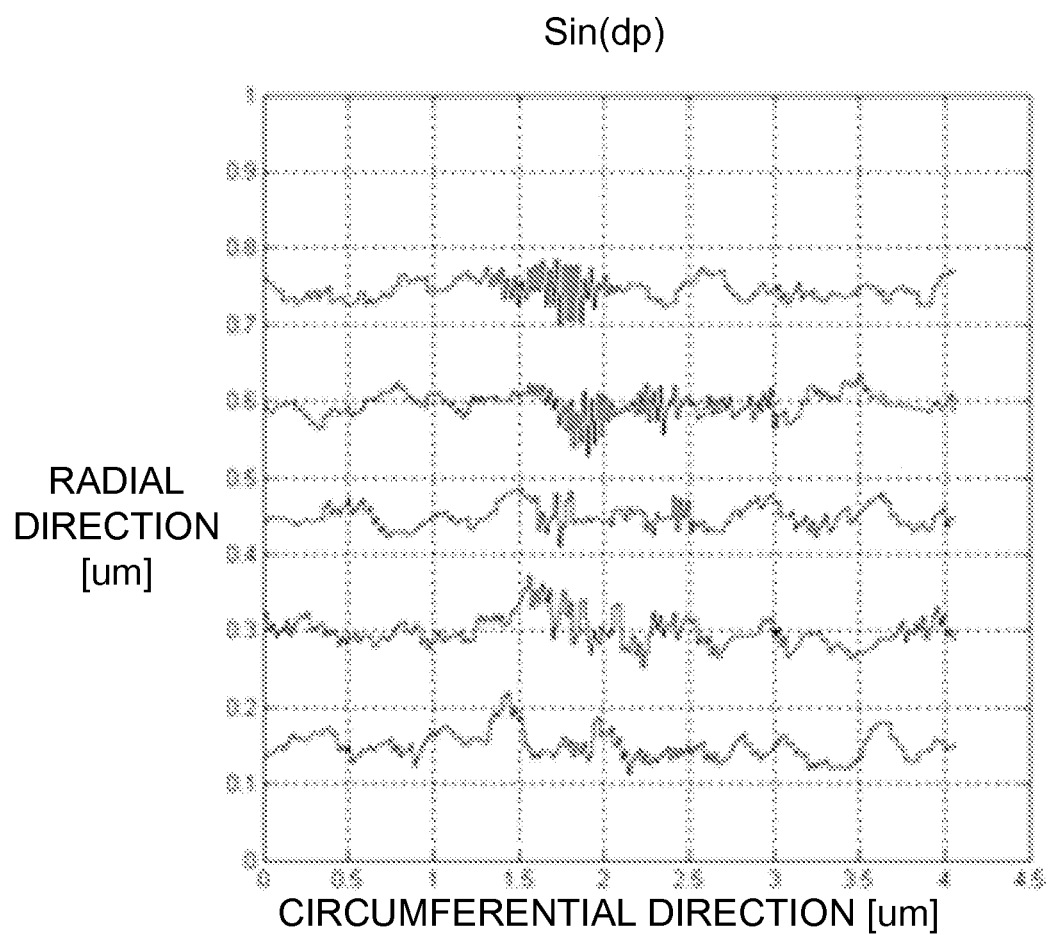
Figure 13D:
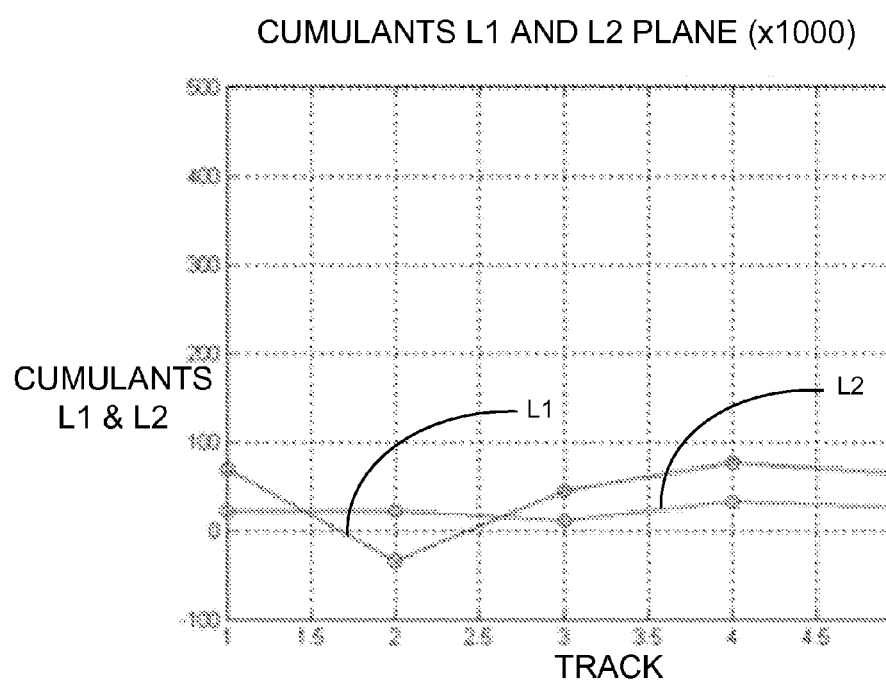
Figure 13E:
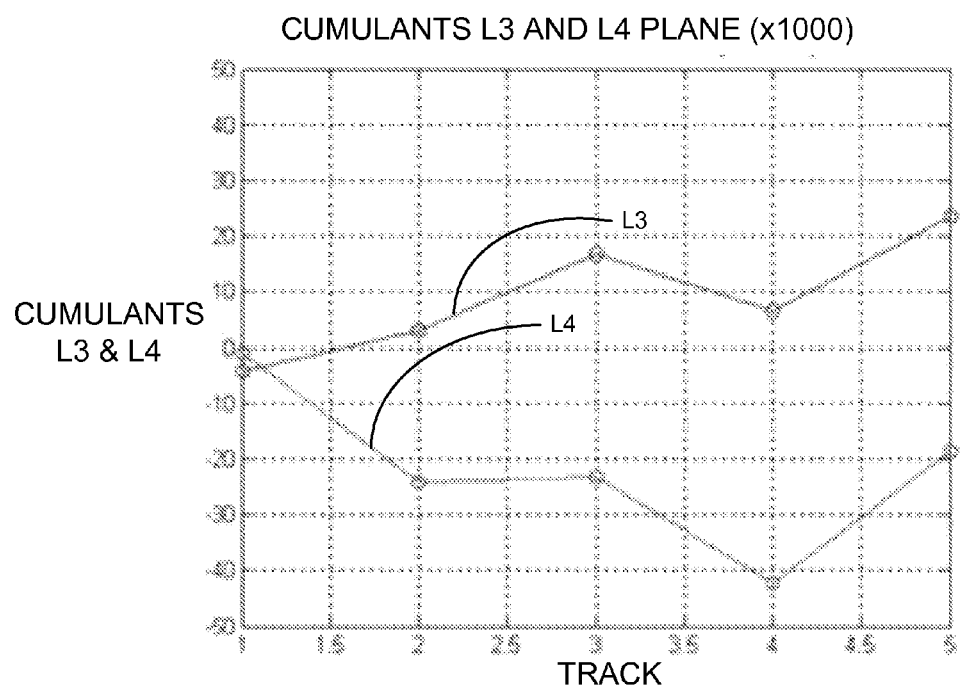

In FIG. 13A, an example readback waveform with a radial direction illustrated relative to the vertical axis and a circumferential direction illustrated relative to the horizontal axis for the example 5 TA or TADLM defect tracks. FIG. 13B illustrates example amplitude modulation signals M(t)Cos(dp) with a radial direction illustrated relative to the vertical axis and a circumferential direction illustrated relative to the horizontal axis for the example 5 TA or TADLM defect tracks. FIG. 13C illustrates example phase modulation signals Sin(dp) with a radial direction illustrated relative to the vertical axis and a circumferential direction illustrated relative to the horizontal axis for the example 5 TA or TADLM defect tracks. FIG. 13D illustrates example L1, mean and L2, variance plane (×1000) of phase modulation (PM) signals with cumulants L1 and L2 illustrated relative to the vertical axis and tracks illustrated relative to the horizontal axis for the example 5 TA or TADLM defect tracks. FIG. 13E illustrates example L3, skew and L4, variance plane (×1000) of phase modulation (PM) signals with cumulants L3 and L4 illustrated relative to the vertical axis and tracks illustrated relative to the horizontal axis for the example 5 TA or TADLM defect tracks.

While the present invention has been described with reference to the details of the embodiments of the invention shown in the drawing, these details are not intended to limit the scope of the invention as claimed in the appended claims.

What is claimed is:

1. A method for implementing magnetic defect classification for hard disk drives comprising:
    receiving a readback signal and producing analog-to-digital converter (ADC) readback signal samples;
    processing said ADC readback signal samples and generating a phase modulation (PM) signal including bandpass filtering said ADC readback signal samples signal and forming a complex delta vector by assignment of adjacent ADC sample pairs; and
    using said phase modulation (PM) signal to classify magnetic media bump and pit defects.

2. The method for implementing magnetic defect classification as recited in claim 1 wherein processing said ADC readback signal samples and generating a phase modulation (PM) signal further includes generating an amplitude modulation (AM) signal.

3. The method for implementing magnetic defect classification as recited in claim 2 includes uses said phase modulation (PM) signal and said amplitude modulation (AM) signal to classify the magnetic media bump and pit defects.

4. The method for implementing magnetic defect classification as recited in claim 2 includes uses said phase modulation (PM) signal and identifying a defect window.

5. The method for implementing magnetic defect classification as recited in claim 1 wherein said readback signal is a 2T pattern readback signal and includes assignment of 2T pattern adjacent ADC sample pairs represented by $0 \rightarrow \Delta V_n = +x_{n+1} + jx_n$ ($x_n$ is zero, $x_{n+1}$ is +peak)

$1 \rightarrow \Delta V_n = +x_n - jx_{n+1}$ ($x_n$ is +peak, $x_{n+1}$ is zero)

$2 \rightarrow \Delta V_n = -x_{n+1} - jx_n$ ($x_n$ is zero, $x_{n+1}$ is -peak)

$3 \rightarrow \Delta V_n = -x_n + jx_{n+1}$ ($x_n$ is -peak, $x_{n+1}$ is zero).

6. The method for implementing magnetic defect classification as recited in claim 1 includes performing trigonometric calculations using an iterative, shift and add algorithm.

7. The method for implementing magnetic defect classification as recited in claim 6 includes rotating said complex delta vector to provide a positive real vector.

8. An apparatus for implementing magnetic defect classification for hard disk drives comprising:
    an analog-to-digital converter (ADC) receiving a readback signal and producing ADC readback signal samples;
    a signal processing circuit coupled to said ADC receiving said ADC readback signal samples and generating a phase modulation (PM) signal;
    a bandpass filter coupled to said ADC bandpass filtering said ADC readback signal samples;
    a delta vector function coupled to said bandpass filter forming a complex delta vector by assignment of adjacent ADC sample pairs; and
    a defect classification function coupled to said signal processing circuit using said phase modulation (PM) signal to classify magnetic media bump and pit defects.

9. The apparatus for implementing magnetic defect classification as recited in claim 8 wherein said signal processing circuit generates an amplitude modulation (AM) signal.

10. The apparatus for implementing magnetic defect classification as recited in claim 9 wherein said defect classification function uses said phase modulation (PM) signal and said amplitude modulation (AM) signal to classify magnetic media bump and pit defects.

11. The apparatus for implementing data detection as recited in claim 8 wherein said readback signal is a 2T pattern readback signal and includes assignment of 2T pattern adjacent ADC sample pairs represented by $0 \rightarrow \Delta V_n = +x_{n+1} + jx_n$ ($x_n$ is zero, $x_{n+1}$ is +peak)

$1 \rightarrow \Delta V_n = +x_n - jx_{n+1}$ ($x_n$ is +peak, $x_{n+1}$ is zero)

$2 \rightarrow \Delta V_n = -x_{n+1} - jx_n$ ($x_n$ is zero, $x_{n+1}$ is -peak)

$3 \rightarrow \Delta V_n = -x_n + jx_{n+1}$ ($x_n$ is -peak, $x_{n+1}$ is zero).

12. The apparatus for implementing data detection as recited in claim 8 wherein said signal processing circuit includes a trigonometric function coupled to said delta vector function performing trigonometric calculations to rotate said complex delta vector.

13. The apparatus for implementing data detection as recited in claim 12 wherein said trigonometric function includes an iterative shift and add algorithm.

14. A system for implementing magnetic defect classification comprising:
    a hard disk drive including at least one recordable magnetic media;
    an analog-to-digital converter (ADC) receiving a readback signal and producing ADC readback signal samples;
    a signal processing circuit coupled to said ADC receiving said ADC readback signal samples and generating a phase modulation (PM) signal;
    a bandpass filter coupled to said ADC bandpass filtering said ADC readback signal samples;
    a delta vector function coupled to said bandpass filter forming a complex delta vector by assignment of adjacent ADC sample pairs; and
    a defect classification function coupled to said signal processing circuit using said phase modulation (PM) signal to classify magnetic media bump and pit defects.

15. The system for implementing magnetic defect classification as recited in claim 14 wherein said signal processing circuit generates an amplitude modulation (AM) signal; and wherein said defect classification function uses said phase modulation (PM) signal and said amplitude modulation (AM) signal to classify magnetic media bump and pit defects.

* * * * *